(12) United States Patent
Faitelson et al.

(10) Patent No.: US 8,578,507 B2
(45) Date of Patent: Nov. 5, 2013

(54) ACCESS PERMISSIONS ENTITLEMENT REVIEW

(75) Inventors: Yakov Faitelson, Elkana (IL); Ohad Korkus, Herzilia (IL); Ophir Kretzer-Katzir, Reut (IL); David Bass, Beit Hashmonai (IL)

(73) Assignee: Varonis Systems, Inc., New York, NY (US)

( * ) Notice: Subject to any disclaimer, the term of this patent is extended or adjusted under 35 U.S.C. 154(b) by 269 days.

(21) Appl. No.: 12/814,807

(22) Filed: Jun. 14, 2010

(65) Prior Publication Data

US 2011/0061111 A1 Mar. 10, 2011

Related U.S. Application Data

(60) Provisional application No. 61/240,726, filed on Sep. 9, 2009.

(51) Int. Cl.
*G06F 17/30* (2006.01)
*G06F 21/00* (2013.01)
*G06F 15/173* (2006.01)

(52) U.S. Cl.
USPC ............................................ 726/28; 709/224

(58) Field of Classification Search
USPC ............................................ 726/28; 709/224
See application file for complete search history.

(56) References Cited

U.S. PATENT DOCUMENTS

| | | |
|---|---|---|
| 5,465,387 A | 11/1995 | Mukherjee |
| 5,889,952 A | 3/1999 | Hunnicutt et al. |
| 5,899,991 A | 5/1999 | Karch |
| 6,023,765 A | 2/2000 | Kuhn |
| 6,308,173 B1 | 10/2001 | Glasser et al. |
| 6,338,082 B1 | 1/2002 | Schneider |
| 6,393,468 B1 | 5/2002 | McGee |
| 6,772,350 B1 | 8/2004 | Belani et al. |
| 6,928,439 B2 | 8/2005 | Satoh |
| 7,031,984 B2 | 4/2006 | Kawamura et al. |
| 7,068,592 B1 | 6/2006 | Duvaut et al. |
| 7,403,925 B2 | 7/2008 | Schlesinger et al. |
| 7,421,740 B2 | 9/2008 | Fey et al. |
| 7,555,482 B2 | 6/2009 | Korkus |
| 7,606,801 B2 | 10/2009 | Faitelson et al. |
| 7,716,240 B2 | 5/2010 | Lim |

(Continued)

FOREIGN PATENT DOCUMENTS

CN 1588889 A 3/2005

OTHER PUBLICATIONS

USPTO OA mailed Dec. 14, 2010 in connecton with U.S. Appl. No. 11/789,884.

(Continued)

*Primary Examiner* — Kambiz Zand
*Assistant Examiner* — Aubrey Wyszynski
(74) *Attorney, Agent, or Firm* — Ladas & Parry LLP

(57) ABSTRACT

A system for operating an enterprise computer network including multiple network objects, said system comprising monitoring and collection functionality for obtaining continuously updated information regarding at least one of access permissions and actual usage of said network objects, and entitlement review by owner functionality operative to present to at least one owner of at least one network object a visually sensible indication of authorization status including a specific indication of users which were not yet authorized by said at least one owner of said at least one network object.

19 Claims, 2 Drawing Sheets

(56) References Cited

U.S. PATENT DOCUMENTS

| | | | |
|---|---|---|---|
| 2003/0048301 A1 | 3/2003 | Menninger | |
| 2003/0051026 A1 | 3/2003 | Carter et al. | |
| 2003/0231207 A1* | 12/2003 | Huang | 345/752 |
| 2004/0030915 A1 | 2/2004 | Sameshima et al. | |
| 2004/0186809 A1* | 9/2004 | Schlesinger et al. | 705/50 |
| 2004/0205342 A1 | 10/2004 | Roegner | |
| 2004/0249847 A1 | 12/2004 | Wang et al. | |
| 2004/0254919 A1* | 12/2004 | Giuseppini | 707/3 |
| 2005/0086529 A1 | 4/2005 | Buchsbaum | |
| 2005/0108206 A1 | 5/2005 | Lam et al. | |
| 2005/0120054 A1 | 6/2005 | Shulman et al. | |
| 2005/0203881 A1 | 9/2005 | Sakamoto et al. | |
| 2005/0246762 A1 | 11/2005 | Girouard et al. | |
| 2005/0278334 A1 | 12/2005 | Fey et al. | |
| 2006/0064313 A1 | 3/2006 | Steinbarth et al. | |
| 2006/0184459 A1 | 8/2006 | Parida | |
| 2006/0184530 A1 | 8/2006 | Song et al. | |
| 2006/0277184 A1 | 12/2006 | Faitelson et al. | |
| 2007/0011091 A1* | 1/2007 | Smith | 705/39 |
| 2007/0061487 A1* | 3/2007 | Moore et al. | 709/246 |
| 2007/0073698 A1 | 3/2007 | Kanayama et al. | |
| 2007/0112743 A1* | 5/2007 | Giampaolo et al. | 707/3 |
| 2007/0156693 A1 | 7/2007 | Soin et al. | |
| 2007/0198608 A1* | 8/2007 | Prahlad et al. | 707/202 |
| 2007/0203872 A1 | 8/2007 | Flinn et al. | |
| 2007/0244899 A1 | 10/2007 | Faitelson et al. | |
| 2007/0266006 A1 | 11/2007 | Buss | |
| 2007/0282855 A1 | 12/2007 | Chen et al. | |
| 2008/0097998 A1 | 4/2008 | Herbach | |
| 2008/0162707 A1* | 7/2008 | Beck et al. | 709/229 |
| 2008/0209535 A1* | 8/2008 | Athey et al. | 726/11 |
| 2008/0256619 A1* | 10/2008 | Neystadt et al. | 726/11 |
| 2008/0271157 A1* | 10/2008 | Faitelson et al. | 726/27 |
| 2009/0031418 A1 | 1/2009 | Matsuda et al. | |
| 2009/0100058 A1 | 4/2009 | Faitelson et al. | |
| 2009/0119298 A1* | 5/2009 | Faitelson et al. | 707/9 |
| 2009/0265780 A1 | 10/2009 | Korkus et al. | |
| 2009/0320088 A1 | 12/2009 | Gill et al. | |

OTHER PUBLICATIONS

USPTO OA mailed Dec. 14, 2010 in connection with U.S. Appl. No. 11/1786,522.

Sahadeb De, et al; "Secure Access Control in a Multi-user Geodatabase", available on the Internet at: URL http://www10.giscafe.com.2005.

Sara C Madeira, et al; "Biclustering Algorithms for Biological Data Analysis:A Survey", Mar. 2004, http;//www.cs.princeton.edu/courses/archive/spr05/cos598E/bib/bicluster.pdf.

Sara C Madiera; "Clustering, Fuzzy Clustering and Biclustering: An Overview", pp. 31-53, Jun. 27, 2003.

Genunix; "Writing Filesystems—VFS and Vnode interfaces" 5 pages, Oct. 2007; Retrieved from http://www.genunix.org/wiki/index.php/Writing_Filesystems—VFS_and_Vnode_interfaces.

S.R.Kleiman; "Vnodes: An Architecture for Multiple File System Types in Sun Unix" USENIX Association: Summer Conference Proceedings, Atlanta 1986, pages 1-10.

Findutils-GNU Project-Free Software Foundation (FSF), 3 pages, Nov. 2006.

USPTO-OA mailed Feb. 12, 2008 in connection with U.S. Appl. No. 11/258,256.

USPTO-OA mailed Aug. 1, 2008 in connection with U.S. Appl. No. 11/258,256.

USPTO-OA mailed Oct. 31, 2008 in connection with U.S. Appl. No. 11/635,736.

USPT0-OA mailed Jul. 9, 2010 in connection with U.S. Appl. No. 11/789,884.

Written Opinion of International Searching Authority dated May 20, 2010 for Applicant's PCT/IL10/00069.

International Search Report: PCT/IL10/00069.

An International Search Report and a Written Opinion both dated May 23, 2011 which issued during the prosecution of Applicant's PCT/IL11/00065.

An International Search Report and a Written Opininon both dated May 25, 2011 which issued during the prosecution of Applicant's PCt/IL11/00078.

An International Search Report and a Written Opinion both dated May 24, 2011 which issued during the prosecution of Applicant's PCT/IL11/00077.

An Office Action dated Jul. 5, 2012, which issued during the prosecution of U.S. Appl. No. 12/772,450.

An International Preliminary Report on Patentability dated Jul. 31, 2012, which issued during the prosecution of Applicant's PCT/IL2011/000065.

An International Preliminary Report on Patentability dated Jul. 31, 2012, which issued during the, prosecution of Applicant's PCT/IL2011000078.

USPTO NFOA mailed Mar. 13, 2012 in connection with U.S. Appl. No. 11/786,522.

International Preliminary Report on Patentability dated Mar. 22, 2012 issued during the prosecution of PCT/IL2010/000069.

An Office Action dated Feb. 14, 2013, which issued during the prosecution of U.S. Appl. No. 13/014,762.

An Office Action dated Mar. 25, 2013, which issued during the prosecution of U.S. Appl. No. 13/303,826.

* cited by examiner

ACCESS PERMISSIONS ENTITLEMENT REVIEW

REFERENCE TO RELATED APPLICATIONS

Reference is made to U.S. Provisional Patent Application Ser. No. 61/240,726, filed Sep. 9, 2009 and entitled "USE OF ACCESS METRIC IN LARGE SCALE DATA MANIPULATION", the disclosure of which is hereby incorporated by reference and priority of which is hereby claimed pursuant to 37 CFR 1.78(a) (4) and (5)(i).

Reference is also made to U.S. patent application Ser. No. 12/673,691, filed Jan. 27, 2010, and entitled "ENTERPRISE LEVEL DATA MANAGEMENT", the disclosure of which is hereby incorporated by reference and priority of which is hereby claimed pursuant to 37 CFR 1.78(a) (1) and (2)(i).

Reference is also made to the following patents and patent applications, owned by assignee, the disclosures of which are hereby incorporated by reference:

U.S. Pat. Nos. 7,555,482 and 7,606,801; and

U.S. Published Patent Application Nos. 2007/0244899, 2008/0271157, 2009/0100058, 2009/0119298 and 2009/0265780.

FIELD OF THE INVENTION

The present invention relates to data management generally and more particularly enterprise level data management.

BACKGROUND OF THE INVENTION

The following patent publications are believed to represent the current state of the art:

U.S. Pat. Nos. 5,465,387; 5,899,991; 6,338,082; 6,393,468; 6,928,439; 7,031,984; 7,068,592; 7,403,925; 7,421,740; 7,555,482 and 7,606,801; and U.S. Published Patent Application Nos.: 2003/0051026; 2004/0249847; 2005/0108206; 2005/0203881; 2005/0120054; 2005/0086529; 2006/0064313; 2006/0184530; 2006/0184459 and 2007/0203872.

SUMMARY OF THE INVENTION

The present invention provides improved systems and methodologies for data management.

There is thus provided in accordance with a preferred embodiment of the present invention a system for operating an enterprise computer network including multiple network objects, the system including monitoring and collection functionality for obtaining continuously updated information regarding at least one of access permissions and actual usage of the network objects, and entitlement review by owner functionality operative to present to at least one owner of at least one network object a visually sensible indication of authorization status including a specific indication of users which were not yet authorized by the at least one owner of the at least one network object.

Preferably, the system resides on a computer server which is connected to an enterprise level network to which is connected a multiplicity of computers and storage devices.

In accordance with a preferred embodiment of the present invention, the entitlement review by owner functionality is operative to periodically present to the at least one owner of the at least one network object the visually sensible indication of authorization status. Additionally, the visually sensible indication of authorization status includes a list of network objects owned by the at least one owner of the at least one network object.

Preferably, for each of the list of network objects, the visually sensible indication of authorization status includes a list of users and user groups having access permissions to each of the list of network objects. Additionally, for each of the list of users and user groups having access permissions to each of the list of network objects the authorization status includes at least an indication of whether the access permissions were not authorized by the at least one owner of the at least one network object.

There is also provided in accordance with another preferred embodiment of the present invention a system for operating an enterprise computer network including multiple network objects, the system including monitoring and collection functionality for obtaining continuously updated information regarding at least one of access permissions and actual usage of the network objects, and entitlement review by owner functionality operative to present to at least one owner of at least one network object a visually sensible indication of authorization status, and to require the at least one owner to confirm or modify the authorization status.

Preferably, the system resides on a computer server which is connected to an enterprise level network to which is connected a multiplicity of computers and storage devices.

In accordance with a preferred embodiment of the present invention, the entitlement review by owner functionality is operative to periodically present to the at least one owner of the at least one network object the visually sensible indication of authorization status and to periodically require the at least one owner to confirm or modify the authorization status. Additionally, the visually sensible indication of authorization status includes a list of network objects owned by the at least one owner of the at least one network object.

Preferably, for each of the list of network objects, the visually sensible indication of authorization status includes a list of users and user groups having access permissions to each of the list of network objects. Additionally, for each of the list of users and user groups having access permissions to each of the list of network objects the authorization status includes at least an indication of whether the access permissions were not authorized by the at least one owner of the at least one network object and a revocation recommendation to the at least one owner of the at least one network object recommending whether the access permissions should be revoked from the user or user group.

Preferably, the revocation recommendation includes a textual justification for the revocation recommendation. Additionally or alternatively the entitlement review by owner functionality includes access permissions modifying functionality. Preferably, the access permissions modifying functionality is preset to modify access permissions in accordance with the revocation recommendations.

In accordance with a preferred embodiment of the present invention, when the at least one owner of the at least one network object utilizes the access permissions modifying functionality to modify access permissions to any of the list of network objects, the entitlement review by owner functionality requires the at least one owner of the at least one network object to write a justification for modifying access permissions to any of the list of network objects. Preferably, when the at least one owner of the at least one network object chooses to disregard the revocation recommendation associated with the at least one network object, the entitlement review by owner functionality requires the at least one owner of the at least one network object to write a justification for disregarding the revocation recommendation associated with the at least one network object.

There is further provided in accordance with yet another preferred embodiment of the present invention a method for operating an enterprise computer network including multiple network objects, the method including monitoring and collecting continuously updated information regarding at least one of access permissions and actual usage of the network objects, and presenting to at least one owner of at least one network object an entitlement review which includes a visually sensible indication of authorization status including a specific indication of users which were not yet authorized by the at least one owner of the at least one network object.

There is yet further provided in accordance with still another preferred embodiment of the present invention a method for operating an enterprise computer network including multiple network objects, the method including monitoring and collecting continuously updated information regarding at least one of access permissions and actual usage of the network objects, and presenting to at least one owner of at least one network object an entitlement review which includes a visually sensible indication of authorization status, and requiring the at least one owner to confirm or modify the authorization status.

BRIEF DESCRIPTION OF THE DRAWINGS

The present invention will be understood and appreciated more fully from the following detailed description, taken in conjunction with the drawings in which.

DETAILED DESCRIPTION OF PREFERRED EMBODIMENTS

Figure 1A:
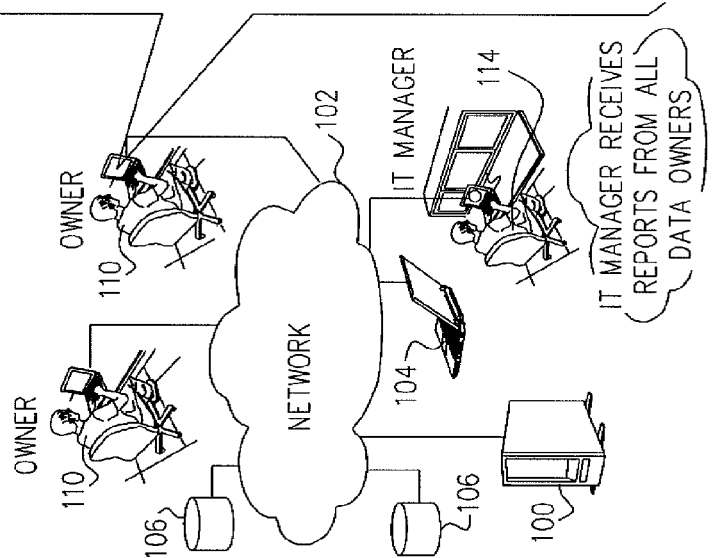
FIGS. 1A and 1B are simplified illustrations of the operation of an access permissions entitlement system, constructed and operative in accordance with a preferred embodiment of the present invention.
Figure 1B:
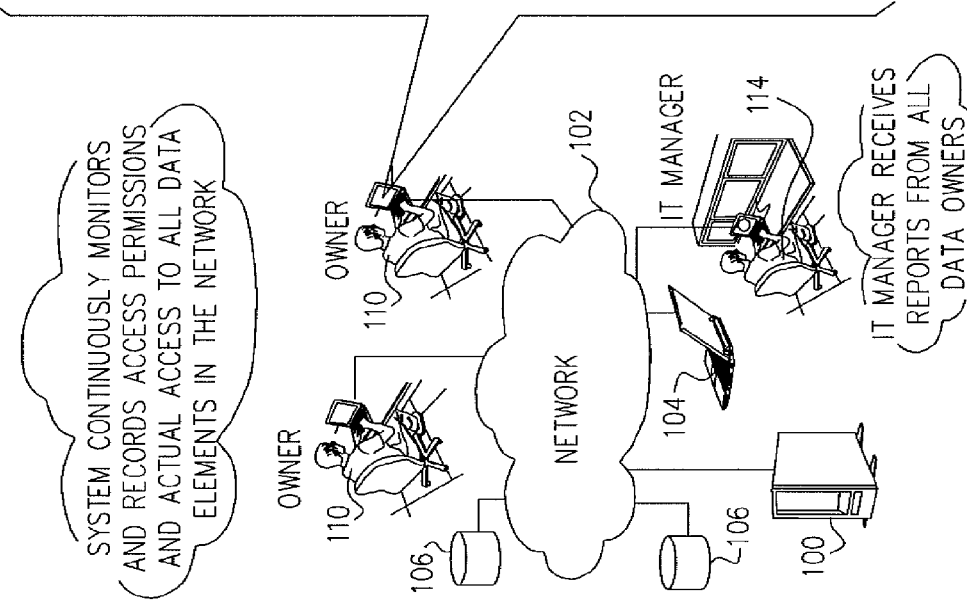

Reference is now made to FIGS. 1A and 1B which are simplified diagrams illustrating an access permissions entitlement system, constructed and operative in accordance with a preferred embodiment of the present invention.

This system is preferably suitable for operating an enterprise computer network including multiple network objects such as disparate users, user groups and network resources, and includes:

monitoring and collection functionality for obtaining continuously updated information regarding at least one of access permissions and actual usage of the network objects; and entitlement review by owner functionality operative to present to at least one owner of at least one network object a visually sensible indication of authorization status including a specific indication of users which were not yet authorized by the at least one owner of the at least one network object, and to require the at least one owner to confirm or modify the authorization status.

The terra "network object" for the purposes of this application is defined to include user generated enterprise computer network resources on any commercially available computer operating system. Examples of network objects include structured and unstructured computer data resources such as files and folders, and user groups.

The owner of a network object is responsible for the authorization of permissions to the network object. For example, permissions may include read or write permissions to a file, modification permissions to a folder (e.g. permissions to create or delete files), and modification permissions to a user group (e.g. permissions to add or remove a user from the group).

As seen in FIG. 1A, the system may reside on a server 100, connected to an enterprise level network 102, to which may be connected hundreds or thousands of computers 104 and storage devices 106. A matrix (not shown) is defined at any given time, including all of the network objects in the enterprise at that time. Various aspects of changes made to access permissions of network objects and actual usage of network objects are applied to the matrix by the system.

Periodically, the system presents to all network object owners in the network a data entitlement review. For example, as seen in FIG. 1A, on Jul. 1, 2009 at 9:00 AM a network object owner 110 is provided with a quarterly entitlement review 112, which the network object owner 110 is required to review, modify if necessary and approve.

The quarterly entitlement review 112 preferably includes a list of folders owned by the network object owner 110. For each folder, the entitlement review 112 preferably includes a list of users and user groups currently having access permissions to the folder, and for each of the users and user groups currently having access permissions to the folder, the entitlement review 112 preferably includes:

an indication of whether the access permissions were not previously authorized by the network object owner 110;

a revocation recommendation, which may be provided by the system to the network object owner 110 recommending that the access permissions be revoked from the user or user group;

access permissions modifying functionality comprising an "allow" option and a "remove" option, whereby the system preselects one of the two options on the basis of the current state of the system and the revocation recommendation; and an explanation text field to be filled in by the network object owner 110 upon modifying the current access permissions, whether as a result of a revocation recommendation or not, or upon deciding to disregard a revocation recommendation. Where a revocation recommendation is provided by the system, the explanation field will be pre-filled by the system, and will contain a brief justification for the revocation recommendation.

For example, as seen in FIG. 1A, the entitlement review 112 indicates that Dan, Sam and Tom, as well as members of user groups group 1 and group 2 currently have access permissions to folder 1, and also indicates that the owner 110 has not authorized Tom's access permissions to folder 1. The entitlement review 112 includes a revocation recommendation to revoke access permissions to folder 1 from Dan, justified by the fact that Dan does not actually access folder 1. The entitlement review 112 also includes a revocation recommendation to revoke access permissions to folder 1 from Tom, justified by the fact that Tom's access permissions to folder 1 were not authorized by owner 110.

As seen in FIG. 1A, at a later time, such as at 9:30 AM, the network object owner 110 reviews the entitlement review 112 and decides to continue to allow Dan access permissions to folder 1, notwithstanding a contrary revocation recommendation provided by the system, and writes a justifying explanation for doing so, the explanation being that Dan requires access to folder 1. The network object owner 110 also decides to revoke access permissions to folder 1 from Tom as recommended by the system.

Upon completing the review and modification of the entitlement review 112, the network object owner 110 preferably approves the report, for example by ticking a check box next to an appropriately worded approval. The network object owner 110 then submits the completed report, for example by clicking a submit button, whereby the report is then submitted to the system and is preferably sent to the enterprise IT manager 114. The system utilizes information in the report to modify access permissions of users to network objects, for example by modifying access permissions of specific users to specific network objects, or by modifying group memberships of specific users whereby membership in specific groups may allow access to specific network objects.

Additionally or alternatively, as seen in FIG. 1B, the quarterly entitlement review 112 provided to the network object owner 110 on Jul. 1, 2009 at 9:00 AM preferably includes a list of user groups owned by the network object owner 110. For each user group, the entitlement review 112 preferably includes a list of users currently having access permissions to the user group, and for each of the users currently having access permissions to the user group, the entitlement review 112 preferably includes an indication whether the access permissions were not authorized by the network object owner 110;

a revocation recommendation which may be provided by the system to the network object owner 110, recommending that the access permissions be revoked from the user;

an owner decision option button comprising an "allow" option and a "remove" option, whereby the system pre-selects one of the two options on the basis of the current state of the system and the revocation recommendation; and an explanation text field to be filled in by the network object owner 110 upon modifying the current access permissions whether as a result of a revocation recommendation or not, or upon deciding to disregard a revocation recommendation. Where a revocation recommendation is provided by the system, the explanation field will be pre-filled by the system, and will contain a brief justification for the revocation recommendation.

For example, as seen in FIG. 1B, the entitlement review 112 indicates that Dan, Sam and Tom currently have access permissions to group 1, and also indicates that the owner 110 has not authorized Tom's access permissions to group 1. The entitlement review 112 includes a revocation recommendation to revoke access permissions to group 1 from Dan, justified by the fact that Dan does not actually access group 1. The entitlement review 112 also includes a revocation recommendation to revoke access permissions to group 1 from Tom, justified by the fact that Tom's access permissions to group 1 were not authorized by owner 110.

As seen in FIG. 1B, at a later time, such as at 9:30 AM, the network object owner 110 reviews the entitlement review 112 and decides to continue to allow Dan access permissions to group 1, notwithstanding a contrary revocation provided by the system, and writes a justifying explanation for doing so, the explanation being that Dan requires access to group 1. The network object owner 110 also decides to revoke access permissions to group 1 from Tom as recommended by the system.

Upon completing the review and modification of the entitlement review 112, the network object owner 110 preferably approves the report, for example by ticking a check box next to an appropriately worded approval. The network object owner 110 then submits the completed report, for example by clicking a submit button, whereby the report is then submitted to the system and is preferably sent to the enterprise IT manager 114. The system utilizes information in the report to modify access permissions of users to network objects, for example by modifying access permissions of specific users to specific network objects, or by modifying group memberships of specific users whereby membership in specific groups may allow access to specific network objects.

It will be appreciated by persons skilled in the art that the present invention is not limited by what has been particularly shown and described hereinabove. Rather the scope of the present invention includes both combinations and subcombinations of the various features described hereinabove as well as modifications thereof which would occur to persons skilled in the art upon reading the foregoing description and which are not in the prior art.

The invention claimed is:

1. A system for operating an enterprise computer network including multiple network objects, said system comprising:

monitoring and collection functionality for obtaining continuously updated information regarding at least one of access permissions and actual usage of said network objects; and entitlement review by owner functionality operative to present to at least one owner of at least one network object a visually sensible indication of authorization status including at least:

a list of users and user groups having access permissions to said at least one network object; and a specific indication of which of said list of users and user groups which were not yet authorized by said at least one owner of said at least one network object.

2. A system according to claim 1 and wherein said system resides on a computer server which is connected to an enterprise level network to which is connected a multiplicity of computers and storage devices.

3. A system according to claim 1 and wherein said entitlement review by owner functionality is operative to periodically present to said at least one owner of said at least one network object said visually sensible indication of authorization status.

4. A system according to claim 1 and wherein said visually sensible indication of authorization status comprises a list of network objects owned by said at least one owner of said at least one network object.

5. A system according to claim 4 and wherein for each of said list of network objects, said visually sensible indication of authorization status includes a list of users and user groups having access permissions to said each of said list of network objects.

6. A system according to claim 5 and wherein for each of said list of users and user groups having access permissions to said each of said list of network objects said authorization status includes at least an indication of whether said access permissions were not authorized by said at least one owner of said at least one network object.

7. A system for operating an enterprise computer network including multiple network objects, said system comprising:

monitoring and collection functionality for obtaining continuously updated information regarding at least one of access permissions and actual usage of said network objects; and entitlement review by owner functionality operative to:

present to at least one owner of at least one network object a visually sensible indication of authorization status, said visually sensible indication of authorization status including at least:

a list of users and user groups having access permissions to said at least one network object; and an indication of whether said access permissions were not authorized by said at least one owner of said at least one network object; and to require said at least one owner to confirm or modify said authorization status.

8. A system according to claim 7 and wherein said system resides on a computer server which is connected to an enterprise level network to which is connected a multiplicity of computers and storage devices.

9. A system according to claim 7 and wherein said entitlement review by owner functionality is operative to periodically present to said at least one owner of said at least one network object said visually sensible indication of authorization status and to periodically require said at least one owner to confirm or modify said authorization status.

10. A system according to claim 9 and wherein said visually sensible indication of authorization status comprises a list of network objects owned by said at least one owner of said at least one network object.

11. A system according to claim 10 and wherein for each of said list of network objects, said visually sensible indication of authorization status includes a list of users and user groups having access permissions to said each of said list of network objects.

12. A system according to claim 11 and wherein for each of said list of users and user groups having access permissions to said each of said list of network objects said authorization status includes at least:

an indication of whether said access permissions were not authorized by said at least one owner of said at least one network object; and a revocation recommendation to said at least one owner of said at least one network object recommending whether said access permissions should be revoked from the user or user group.

13. A system according to claim 12 and wherein said revocation recommendation includes a textual justification for said revocation recommendation.

14. A system according to claim 13 and wherein said entitlement review by owner functionality includes access permissions modifying functionality.

15. A system according to claim 14 and wherein said access permissions modifying functionality is preset to modify access permissions in accordance with said revocation recommendations.

16. A system according to claim 15 and wherein when said at least one owner of said at least one network object utilizes said access permissions modifying functionality to modify access permissions to any of said list of network objects, said entitlement review by owner functionality requires said at least one owner of said at least one network object to write a justification for modifying access permissions to any of said list of network objects.

17. A system according to claim 15 and wherein when said at least one owner of said at least one network object chooses to disregard said revocation recommendation associated with said at least one network object, said entitlement review by owner functionality requires said at least one owner of said at least one network object to write a justification for disregarding said revocation recommendation associated with said at least one network object.

18. A method for operating an enterprise computer network including multiple network objects, said method comprising:

monitoring and collecting continuously updated information regarding at least one of access permissions and actual usage of said network objects; and presenting to at least one owner of at least one network object an entitlement review which comprises a visually sensible indication of authorization status including a specific indication of users having access permissions to said at least one network object and which of said users were not yet authorized by said at least one owner of said at least one network object.

19. A method for operating an enterprise computer network including multiple network objects, said method comprising:

monitoring and collecting continuously updated information regarding at least one of access permissions and actual usage of said network objects; and presenting to at least one owner of at least one network object an entitlement review which comprises a visually sensible indication of authorization status including a specific indication of users having access permissions to said at least one network object and an indication of whether said access permissions were not authorized by said at least one owner of said at least one network object, and requiring said at least one owner to confirm or modify said authorization status.

* * * * *